(12) United States Patent
Yu

(10) Patent No.: US 11,368,842 B2
(45) Date of Patent: Jun. 21, 2022

(54) SESSION ESTABLISHMENT METHOD AND MEANS AND COMMUNICATION SYSTEM

(71) Applicant: Alibaba Group Holding Limited, George Town (KY)

(72) Inventor: Xiaobo Yu, Beijing (CN)

(73) Assignee: Alibaba Group Holding Limited

( * ) Notice: Subject to any disclaimer, the term of this patent is extended or adjusted under 35 U.S.C. 154(b) by 75 days.

(21) Appl. No.: 16/995,524

(22) Filed: Aug. 17, 2020

(65) Prior Publication Data

US 2021/0058780 A1 Feb. 25, 2021

(30) Foreign Application Priority Data

Aug. 19, 2019 (CN) .......................... 201910766123.9

(51) Int. Cl.
*H04W 12/08* (2021.01)
*H04W 12/0433* (2021.01)
*H04L 9/40* (2022.01)

(52) U.S. Cl.
CPC ......... *H04W 12/0433* (2021.01); *H04L 63/20* (2013.01); *H04W 12/08* (2013.01)

(58) Field of Classification Search
CPC .... H04L 63/20; H04W 12/08; H04W 12/043; H04W 12/069; H04W 12/37; H04W 12/06; H04W 12/0433; H04W 76/10; H04W 76/20
See application file for complete search history.

(56) References Cited

U.S. PATENT DOCUMENTS

| | | | |
|---|---|---|---|
| 7,903,817 B2 | 3/2011 | Cam-Winget | |
| 7,929,504 B2 | 4/2011 | Wentink | |
| 8,306,229 B2 | 11/2012 | Pang | |
| 10,412,583 B2 | 9/2019 | Vanderveen | |
| 2004/0236939 A1 | 11/2004 | Watanabe | |
| 2007/0060127 A1 | 3/2007 | Forsberg | |
| 2014/0286239 A1 | 9/2014 | Chowdhury | |
| 2019/0215693 A1* | 7/2019 | Lee | H04W 12/10 |
| 2021/0153070 A1* | 5/2021 | Velev | H04W 28/0268 |
| 2022/0014964 A1* | 1/2022 | Fang | H04L 43/062 |

* cited by examiner

*Primary Examiner* — Brian F Shaw
(74) *Attorney, Agent, or Firm* — Van Pelt, Yi & James LLP

(57) ABSTRACT

An exemplary method, device, and system for configuring a session for communication between electronic devices. The method includes sending, by a session management entity of a wireless network, a first request message to a policy control entity of the wireless network, the first request message comprising a key identifier, receiving, by the session management entity, a first response message from the policy control entity, wherein the first response message corresponds to a response to the first request message, and the first response message comprises a session policy for a communication session corresponding to the key identifier, and configuring, by the session management entity, the communication session based at least in part on the session policy.

19 Claims, 8 Drawing Sheets

SESSION ESTABLISHMENT METHOD AND MEANS AND COMMUNICATION SYSTEM

CROSS REFERENCE TO OTHER APPLICATIONS

This application claims priority to People's Republic of China Patent Application No. 201910766123.9 entitled SESSION ESTABLISHMENT METHOD AND MEANS AND COMMUNICATION SYSTEM filed Aug. 19, 2019 which is incorporated herein by reference for all purposes.

FIELD OF THE INVENTION

The present application relates to a field of communication. In particular, the present application relates to a method, device, and system for establishing a session in connection with communication.

BACKGROUND OF THE INVENTION

Internet of Things technology is often referred to as the third information technology revolution after the computer and Internet revolutions. Internet of Things technology is characterized by real-time performance and interactivity among a plurality of devices. The plurality of devices can be interconnected via the Internet. Internet of Things technology has been widely applied to numerous fields, including urban management, digital homes, positioning and navigation, logistics management, and security systems. Security associated with communication of information in connection with implementing Internet of Things systems has become increasingly important. To safeguard the security of services and private user data, Internet of Things devices can communicate with application servers through a set of security mechanisms.

To solve problems such as problems arising in connection with authentication between application servers and Internet of Things devices and the establishment of secure channels between application servers and Internet of Things devices, the 3rd Generation Partnership Project (3GPP) has defined a general authentication mechanism called general bootstrapping architecture (GBA). GBA provides a general mechanism that establishes key sharing between user equipment (UE) (e.g., Internet of Things devices) and servers. GBA is implemented on the basis of the Authentication and Key Agreement (AKA) authentication mechanism. The AKA authentication mechanism is a mutual authentication and key agreement mechanism used in 2G/3G networks. GBA uses the strengths of the AKA authentication mechanism to complete the secure bootstrapping process for services.

FIG. 1 is an architectural diagram of a general bootstrapping architecture (GBA) according to the related art.

Referring to FIG. 1, GBA architecture 100 is provided. GBA includes bootstrapping server function (BSF) element 110. BSF element 110 corresponds to a network element that is configured to introduce or invoke the GBA mechanism. BSF 110 can acquire relevant user data, such as international mobile subscriber identity and an authentication key (Ki), through the Zh interface and a home location register (HLR) or home subscriber server (HSS) 120. BSF 110 can perform two-way authentication with user equipment (UE) 130 using the AKA protocol through the Ub interface. Moreover, after successful authentication, BSF 110 generates a shared key, which is used for secure transmission of information between the UE and network application function (NAF) 140. BSF 110 transmits the shared key, relevant key parameters, user data, etc. via the Zn interface to NAF 140. BSF 110 connects to subscription locator function (SLF) 150 via the Dz interface to obtain information pertaining to the user or UE 130. For example, BSF 110 can obtain a location or identity of HSS 120 corresponding to UE 130.

The authentication and key management for applications based on the 3GPP credential in the 5G Authentication and Key Agreement for Applications (AKMA) project is currently researching how to adapt operator open key capabilities to 5G systems. The 5G project proposes a new anchor function to manage the new key (e.g., AKMA anchor key (KAKMA)) introduced into the 5G key system and uses KAKMA (also referred to herein as KAKMA) as a basis to generate the application-layer end-to-end key KAF.

However, the AKMA scheme merely includes generating a key from the 5G core network key system for application-layer encryption. Some of the network elements of the core network are unable to obtain or identify services or sessions that use AKMA to generate application keys. Therefore, services that can be easily differentiable based on different application-layer keys cannot be provided under related art systems.

Accordingly, there is a need for a method and system for communicating information pertaining to services that can be differentiable based at least in part on application-layer keys.

BRIEF DESCRIPTION OF THE DRAWINGS

Various embodiments of the invention are disclosed in the following detailed description and the accompanying drawings.

DETAILED DESCRIPTION

Figure 1:
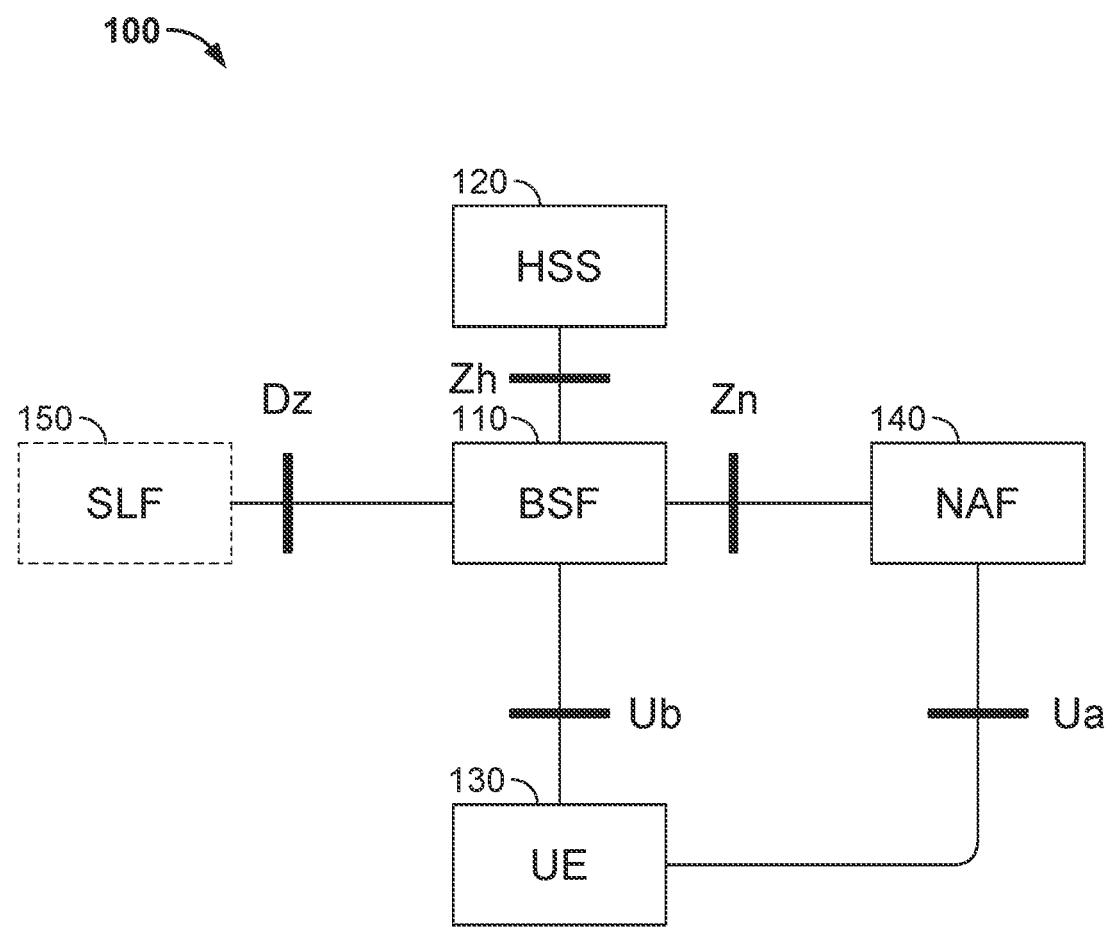
FIG. 1 is an architectural diagram of a general bootstrapping architecture (GBA) according to the related art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to give persons skilled in the art a better understanding of the present application, technical schemes in embodiments of the present application are described clearly and completely in light of the drawings of the embodiments of the present application. Obviously, the embodiments described are merely some of the embodiments of the present application and are not all the embodiments. So long as no additional creative effort is expended, all other embodiments that are obtained by persons with ordinary skill in the art on the basis of embodiments in the present application shall fall within the scope of protection of the present application.

Please understand that the terms "first," "second," etc. in the description, claims, and drawings of the present application are used to differentiate similar objects and are not necessarily used to describe their particular sequence or order. It should be understood that data used in this way may be switched as appropriate. Thus, embodiments of the present application described herein can be implemented in sequences other than those shown or described herein. In addition, the terms "comprise" and "have" and the variations thereof are meant to be non-exclusive. For example, a process, method, system, product, or device containing a series of steps or units need not be limited to those steps or units that are clearly listed, but may comprise other steps or units that are not clearly listed or that are intrinsic to these processes, methods, products, or devices.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

According to various embodiments, a user equipment (UE) is a terminal. The UE is configured with network connectivity. For example, the UE can communicate with one or more other terminals or one or more servers via a network connection. The network connection can include Internet connectivity. Various other network connections or mechanisms for communication can be implemented.

According to various embodiments, one or more servers are implemented in connection with establishing a session for one or more UEs. The one or more servers can implement one or more functions or functional entities. As an example, a server of the one or more servers can implement a plurality of functions and/or functional entities. The functions or functional entities that can be implemented in connection with various embodiments include one or more anchor function entities (which are also called AKMA authentication function (AAuF) entities), Policy and Charging Rules Function (PCRF) entities, and Session Management Function (SMF) entities, etc. The anchor function entities can correspond to Authentication and Key Agreement for Applications (AKMA) authentication function (AAuF) entities. Other function entities can be implemented. In some embodiments, an entity (also referred to herein as a function entity) is implemented by a single server. In some situations, multiple functional entities are implemented by one server.

In the related art, the AKMA scheme merely includes generating a key from the 5G core network key system for application-layer encryption. However, the network elements of the 5G core network are unable to obtain or identify services or sessions that use AKMA to generate application keys. Therefore, services that can be easily differentiable based on different application-layer keys cannot be provided under related art systems.

To solve the problem described above, according to various embodiments, after an anchor entity (which is also referred to as an AKMA authentication function (AAuF) entity) generates KAKMA, the anchor entity sends the KAKMA identifier and the corresponding session policy to the policy control function (PCF) entity. In response to obtaining the KAF, the UE carries the KAKMA identifier in the session establishment process. The UE can include the KAKMA in one or more communications pertaining to establishing a session. For example, the KAKMA identifier can be provided to a Session Management Function (SMF) entity. The SMF can use the KAKMA identifier to obtain a session policy for a session corresponding to the KAKMA identifier, and the SMF can modify the corresponding session using a session policy. Based on the above concepts, network elements of the core network can determine (e.g., detect, identify, etc.) services or sessions that use AKMA to generate application keys and provide differentiable services for sessions corresponding to AKMA application-layer keys.

Various embodiments include a method for establishing a session. The establishing a session can include establishing a session for communication between two terminals (e.g., between two UEs, between a UE and a server, etc.). Please note that the steps depicted in the flowcharts in the drawings can be executed in a computer system, such as a group of computers capable of executing instructions. Moreover, although logical sequences are depicted in the flowcharts, the steps that are depicted or described may, in some situations, be executed in sequences other than those described herein.

Figure 2:
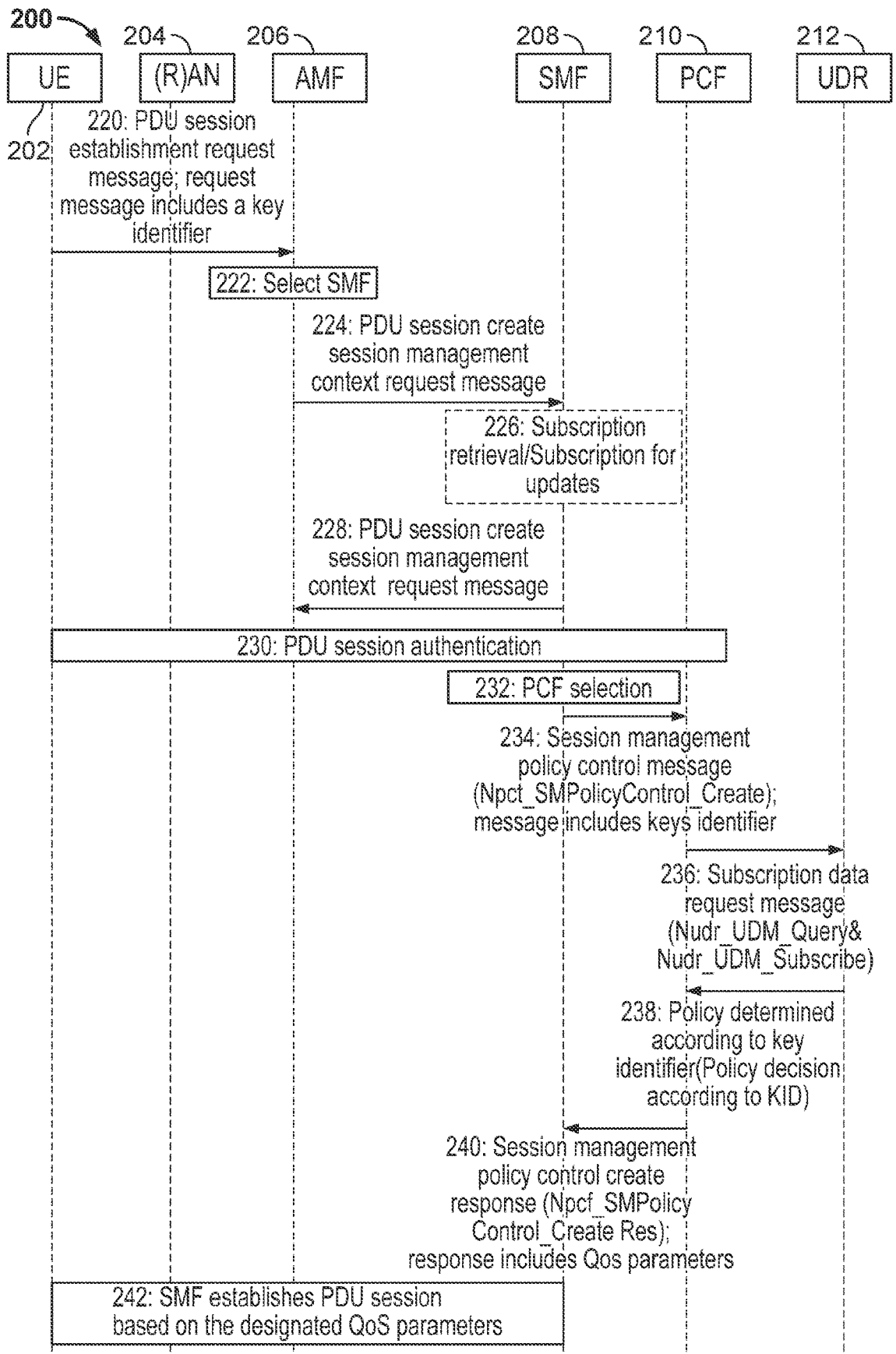
FIG. 2 is a flowchart of a method for establishing a session according to various embodiments of the present application.

FIG. 2 is a flowchart of a method for establishing a session according to various embodiments of the present application.

Referring to FIG. 2, process 200 is provided. Process 200 can be implemented in connection with process 400 of FIG. 4A, process 450 of FIG. 4B, process 500 of FIG. 5, and/or process 600 of FIG. 6. Process 200 can be implemented at least in part by computer system 700 of FIG. 7.

At 220, a protocol data unit (PDU) session establishment request is communicated. In some embodiments, user equipment (UE) 202 communicates the PDU session establishment request to an access and mobility management function (AMF) entity 206. The PDU session establishment request can include a key identifier (e.g., KAKMA ID), a protocol data unit (PDU) session ID, and a requested PDU session type. The KAKMA ID can be used to differentiate different KAKMAs. According to various embodiments, UE 202 corresponds to an Internet of Things (IoT) terminal. AMF entity 206 is configured to receive connection and session related information from UE 202. In some embodiments, AMF entity 206 is configured to handle connection and mobility management tasks. AMF entity 206 can forward messages pertaining to session management to another entity such as a Session Management Function (SMF) entity (e.g., SMF entity 208). In some embodiments, UE 202 communicates the PDU session establishment request via an access network to which UE 202 is connected. For example, UE 202 can communicate the PDU session establishment request to AMF entity 206 via radio access network ((R)AN) 204. UE 202 can communicate with a network via (R)AN 204.

At 222, an SMF is selected. In some embodiments, in response to receiving the PDU session establishment request, SMF 208 is selected based at least in part on the PDU session establishment request. For example, SMF 208 can be selected based at least in part on the KAKMA ID included in the PDU session establishment request. In some embodiments, AMF 206 selects SMF 208 based at least in part on the PDU session establishment request message. If SMFs corresponding to all available slices are preset in AMF 206, AMF 206 can use the key identifier (e.g., KAKMA ID) included in the session establishment request as a basis to select the SMF (e.g., SMF 208) that supports providing a special session policy based on the key identifier (e.g., KAKMA ID). AMF 206 can further determine (e.g., select) SMF 208 based on a session policy type. In some embodiments, the session policy type is included in the PDU session establishment request. For example, the UE 202 can include the PDU session establishment request to facilitate SMF selection by AMF 206. The session policy type can include a session policy (or an indication of the session policy) that is configured for QoS parameter optimization.

According to various embodiments, the SMF is selected in response to querying a mapping of supported session policy types to SMFs or a mapping of session policies to SMFs based on the session policy or session policy type corresponding to the PDU session establishment request. The mapping of supported session policy types to SMFs or the mapping of session policies to SMFs can be stored locally at AMF 206 or at an entity that is accessible to AMF 206 (e.g., AMF 206 can request another entity to provide an indication of the SMF to be selected).

In some embodiments, if no preset SMF corresponds to an available slice, AMF 206 first sends an Nnssf_NS_Selection_Get message (NSSF network slice selection get message) to a network slice selection function (NSSF) entity in a service public land mobile network (PLMN). AMF 206 can include the session policy type (e.g., an identifier of the session policy type) in the NSSF network slice selection get message. As an example, the session policy type included in the NSSF network slice selection get message corresponds to a session policy that is configured for QoS parameter optimization. The NSSF entity can use the session policy type as a basis to communicate (e.g., send back) a corresponding network slice instance ID (NSI ID) that is capable of providing the session policy. In some embodiments, in response to the NSSF entity obtaining the network repository function (NRF) information of the corresponding slice, AMF 206 sends an Nnrf_NFDiscovery_Request message (NRF network function discovery request message) to an NRF entity. AMF 206 can include session policy type information in the NRF network function discovery request message. The NRF selects an SMF capable of supporting the session policy type based at least in part on the received session policy type information. For example, an NRF can query a mapping of SMFs to supported session policy types to determine one or more SMFs that support the session policy type indicated in the NRF network function discovery request message. The NRF can send an indication to AMF 206 of the selected SMF. For example, the NRF sends the fully qualified domain name (FQDN) or IP address of the SMF capable of supporting the session policy type (e.g., the FQDN or IP address of SMF 208) to AMF 206. In response to receiving the indication of the selected SMF (or indication of one or more SMFs capable of supporting the session policy type), AMF 206 selects SMF 208.

At 224, a PDU session create session management context request is communicated. In some embodiments, the PDU session create session management context request includes the key identifier (e.g., KAKMA ID). In response to selecting the SMF, the PDU session create session management context request can be sent to the corresponding SMF (e.g., SMF 208). For example, AMF 206 sends an Nsmf_PDUSession_CreateSMContext request message (SMF PDU session establishment session management context request message) to the selected SMF 208. The Nsmf_PDUSession_CreateSMContext request message includes the key identifier (e.g., KAKMA ID). The PDU session create session management context request can correspond to an initial access request. In some embodiments, in response to receiving the PDU session create session management context request, SMF 208 obtains an IP address and one or more configuration parameters for a server (e.g., for a DHCP client), and provides the IP address and/or one or more configuration parameters to UE 202.

At 226, information pertaining to a subscription is obtained. In some embodiments, SMF 208 obtains the information pertaining to the subscription. The information pertaining to a subscription corresponds to subscription data for UE 202. As an example, SMF 208 obtains the information pertaining to the subscription in response to receiving the PDU session create session management context request. If the home public land mobile network (HPLMN) corresponding subscription permanent identifier (SUPI), a data network name (DNN), and Single-Network Slice Selection Assistance Information (S-NSSAI) session management subscription data are unavailable, the SMF uses a Nudm_SDM_Get message (SUPI, session management subscription data, DNN, and HPLMN S-NSSAI) to obtain session management subscription data, and when subscription data has changed, the revised subscription parameters are obtained by using a Nudm_SDM_Subscribe message (SUPI, session management subscription data, DNN, and HPLMN S-NSSAI). In some embodiments, the information pertaining to the subscription is obtained based at least in part on the key identifier (e.g., KAKMA ID) included in the PDU session create session management context request.

At 228, a response to the PDU session create session management context request is communicated. The response to the PDU session create session management context request can include information pertaining to the subscription. In some embodiments, SMF 208 communicates to AMF 206 the response to the PDU session create session management context request. As an example, SMF 208 sends an Nsmf_PDUSession_CreateSMContext response message to AMF 206.

At 230, session authentication is performed. In some embodiments, the session authentication includes PDU session authentication. The session authentication can be performed based at least in part on information pertaining to the subscription associated with UE 202. For example, the information pertaining to the subscription that is included in the response to the PDU session create session management context request can be used in connection with the session authentication. UE 202 can receive the response to PDU session create session management context request, obtain the information pertaining to the subscription from the response to PDU session create session management context request, and perform the session authentication. In some embodiments, UE 202 performs secondary authentication through SMF 208. For example, SMF 208 performs secondary authentication of the UE to determine whether UE 202 has been authenticated or authorized by the data network or the same network server such as in connection with a previous PDU session establishment. In some embodiments, in response to SMF 208 determining that UE 202 has been authenticated or authorized by the data network or the same network server, then secondary authentication is complete. Information pertaining to a successful authentication/authorization between UE 202 and SMF 208 can be saved in SMF 208 (or in a storage accessible to SMF 208) and/or a Unified Data Management (UDM) entity. In some embodiments, in response to SMF 208 determining that UE 202 has not been authenticated or authorized by the data network or the same network server, then authentication of UE 202 is performed. In some embodiments, the first authentication is performed in connection with accessing the network and the second authentication is performed in connection with accessing the vertical data network which contains the vertical applications.

At 232, a PCF is selected. In some embodiments, SMF 208 selects the PCF. SMF 208 can select the PCF in response to the session authentication (e.g., in response to UE 202 being authenticated). As illustrated in FIG. 2, SMF 208 selects PCF 210. In some embodiments, SMF 208 selects the PCF based at least in part on the key identifier (e.g., the KAKMA ID).

At 234, a PCF session management policy control create message is communicated. In some embodiments, SMF 208 communicates the PCF session management policy control create message (e.g., an Npcf_SMPolicyControl_Create message) to PCF 210. SMF 208 can send the PCF session management policy control create message in response to SMF 208 selecting the PCF. In some embodiments, the SMF 208 communicates the key identifier (e.g., KAKMA ID) to PCF 210. For example, the PCF session management policy control create message includes the key identifier (e.g., KAKMA ID).

According to various embodiments, in response to receiving the PCF session management policy control create message, PCF 210 determines whether PCF 210 has information pertaining to a subscription for UE 202 (e.g., whether PCF 210 has subscription data relating to UE 202). PCF 210 can determine whether it has the corresponding subscription data locally stored or otherwise accessible to PCF 210 (e.g., via a remote storage or other entity).

At 236, a request for subscription data is communicated. In some embodiments, PCF 210 communicates a request for information pertaining to a subscription for UE 202. In response to PCF 210 determining that PCF 210 does not have subscription data relating to UE 202, PCF 210 sends the request for subscription data to another network entity. In some embodiments, PCF 210 communicates the request for subscription data to unified data repository (UDR) 212. Data relating to the PDU session can be obtained based at least in part on the request for subscription data. For example, in response to receiving the request for subscription data, UDR 212 can obtain the data relating to the PDU session (e.g., subscription data relating to UE 202).

At 238, information pertaining to a subscription for UE 202 is obtained. For example, the policy for UE 202 communication is obtained. According to various embodiments, in response to receiving a request for subscription data, UDR 212 obtains the subscription data corresponding to UE 202 and provides to PCF 210 the subscription data corresponding to UE 202. In response to receiving the subscription data corresponding to UE 202, the policy for UE 202 communication (e.g., the policy for the PDU session) is determined. Determining the policy for UE 202 communication can include configuring one or more parameters pertaining to the PDU session. In some embodiments, in response to receiving the subscription data corresponding to UE 202, PCF 210 accordingly adjusts or updates the session policy for the PDU session (e.g., for the PDU session for UE 202 network communication). In some embodiments, the session policy for the PDU session is configured (e.g., adjusted or updated) based at least in part on the key identifier (e.g., KAKMA ID) associated with the UE 202 (e.g., the key identifier included in the PDU session establishment request communicated by UE 202). According to various embodiments, configuring the session policy for the PDU session comprises configuring one or more parameters pertaining to the PDU session. The one or more parameters pertaining to the PDU session include PDU session Quality of Service (QoS) parameters. As an example, the PDU session QoS parameters include one or more QoS priority parameters (e.g., 5QI, allocation and retention priority (ARP), priority levels, packet delay budget, packet error ratio, maximum data burst volume), etc.

At 240, information pertaining to the session for UE 202 is communicated. In some embodiments, PCF 210 communicates to SMF 208 the information pertaining to the session for UE 202 (e.g., information associated with the session policy for UE 202). As an example, in response to determining the policy for UE 202 communication (configuring one or more parameters pertaining to the PDU session), PCF 210 communicates to SMF 208 the information associated with the session policy for UE 202 (e.g., one or more parameters pertaining to the PDU session). PCF 210 communicates to SMF 208 the information associated with the session policy for UE 202 in connection with PCF 210 sending a PCF session management policy control create response message (e.g., an Npcf_SMPolicyControl_Create Res message) to SMF 208. According to various embodiments, PCF session management policy control create response message comprises the session policy (e.g., one or more QoS parameters) for the PDU session. The one or more QoS parameters can include parameters pertaining to one or more of 5QI, allocation and retention priority (ARP), priority levels, packet delay budget, packet error ratio, and maximum data burst volume.

In some embodiments, in response to receiving PCF session management policy control create response message, SMF 208 can obtain information pertaining to the session for UE 202 (e.g., one or more parameters pertaining to the PDU session). SMF can obtain the one or more QoS parameters from the PCF session management policy control create response message.

At 242, a session is established. In some embodiments, a PDU session is established based at least in part the subscription data. For example, the PDU session is established based at least in part on information pertaining to the policy for the PDU session. In some embodiments, SMF 208 establishes the corresponding PDU session based at least in part on the information pertaining to the policy for the PDU session. The PDU session can be established based at least in part on the one or more QoS parameters. As an example, SMF 208 establishes the PDU session in response to obtaining the information pertaining to the session (e.g., from the PCF session management policy control create response message). SMF 208 can establish the PDU session with UE 202.

According to various embodiments, before the PCF provides information pertaining to a policy for a session (e.g., a session policy) as feedback to the SMF, the PCF updates the session policy that the PCF recorded (e.g., a stored session policy) or the PCF acquires a corresponding session policy from another network element. For example, the PCF obtains a session policy from an AKMA Authentication Function (AAuF) entity (e.g., an anchor function). The manner in which PCF acquires the session policy includes, but is not limited to: the PCF receives a request message sent by the AAuF. The request message can be an existing message or a message which is specially for sending a session policy (e.g., an update request message for updating a session policy). Further description of various embodiments is provided below in view of FIG. 3.

Figure 3:
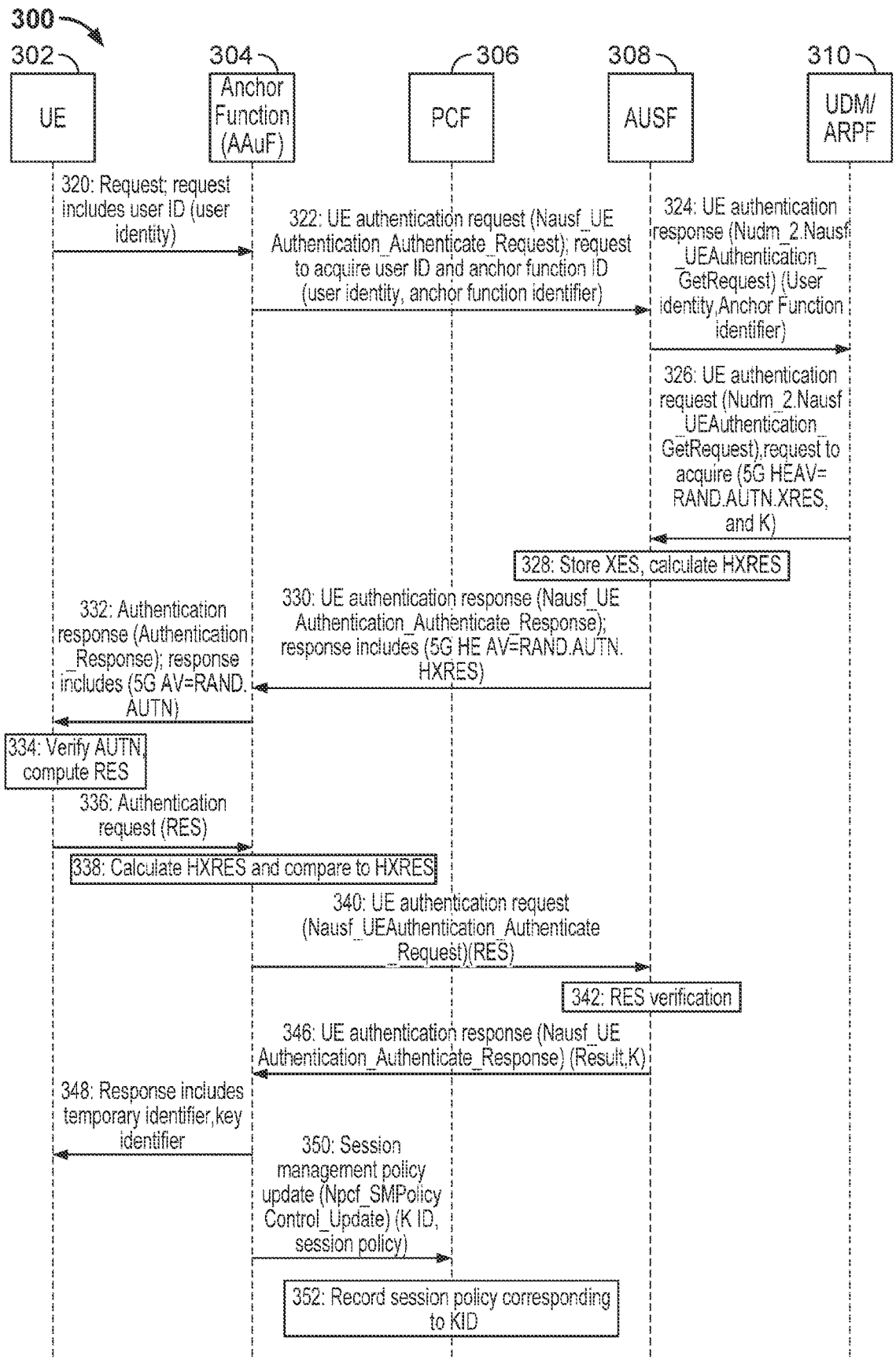
FIG. 3 is a flowchart of a method for establishing a session according to various embodiments of the present application.

FIG. 3 is a flowchart of a method for establishing a session according to various embodiments of the present application.

Referring to FIG. 3, process 300 is provided. Process 300 can be implemented in connection with process 400 of FIG. 4A, process 450 of FIG. 4B, process 500 of FIG. 5, and/or process 600 of FIG. 6. Process 300 can be implemented at least in part by computer system 700 of FIG. 7.

At 320, a request is communicated to an anchor entity. The anchor entity can be an AKMA Authentication Function (AAuF) entity. In some embodiments, UE 302 sends a request to anchor entity 304. According to various embodiments, the request communicated to anchor entity 304 comprises a user identifier (e.g., a user ID). The user ID can identify a user associated with UE 302.

At 322, an authentication request is communicated. The authentication request can correspond to a request to authenticate UE 302. In some embodiments, anchor entity 304 communicates the authentication request to authentication server function (AUSF) entity 308. Anchor entity 304 can communicate the authentication request in response to receiving the request from UE 302 at 320. As an example, anchor entity 304 can call Nausf_UEAuthentication service by sending an Nausf_UEAuthentication_Authenticate request message to AUSF entity 308. In some embodiments, the authentication request message includes the user ID (or another indication associated with the user or UE 302), and an anchor entity ID.

At 324, an authentication request is communicated. According to various embodiments, in response to receiving an authentication request from anchor entity 304, AUSF entity 308 communicates an authentication request to unified data management (UDM) entity 310. As an example, AUSF 308 communicates an Nudm_UEAuthentication_GetRequest to UDM entity 310. The authentication request communicated by AUSF entity 308 can comprise a user ID and an anchor entity ID. The authentication request communicated by AUSF entity 308 can further include an identifier associated with AUSF 308.

At 326, a response to the authentication request is communicated. In some embodiments, in response to receiving the authentication request, UDM entity 310 obtains an authentication result and communicates a response to the authentication request based at least in part on the authentication result. The authentication result can be determined based at least in part on the user ID (or other information that identifies UE 302). UDM entity 310 can communicate the response to the authentication request to AUSF 308. In some embodiments, an Authentication Credential Repository and Processing Function (ARPF) entity determines a result of the authentication request. The ARPF entity can be comprised in UDM 310. In response to the authentication request, UDM 310 (e.g., ARPF) creates a 5G Home Environment Authentication Vector (5G HE AV). The 5G HE AV can comprise one or more of a random number (RAND), an authentication token (AUTN), an expected response (XRES*), and a key (e.g., KAUSF). UDM 310 sends the 5G HE AV back to the AUSF 308.

At 328, information obtained from the response to the authentication request is stored. In some embodiments, in response to receiving the response to the authentication result, AUSF 308 obtains the XRES* from the response to the authentication request and stores the XRES*. For example, AUSF 308 obtains the XRES* from the 5G HE AV and temporarily stores XRES*. AUSF 308 can determine (e.g., calculate) a hash value based at least in part on the XRES*. For example, AUSF 308 determines a hash of the XRES* based at least in part on the XRES*. In some embodiments, an anchor function key (KAKMA) is determined based at least in part on information obtained from the response to the authentication request. For example, the KAKMA is determined based at least in part on the KAUSF comprised in the 5G HE AV and the anchor function ID. According to various embodiments, AUSF 308 generates a 5G AV based at least in part on the 5G HE AV received from UDM 310 and AUSF 308 uses the KAKMA in the 5G HE AV to substitute for HXRES* and the XRES* of KAUSF.

At 330, a UE authentication response is communicated. In some embodiments, the UE authentication response is communicated in response to the authentication request communicated at 322. As an example, AUSF 308 communicates the UE authentication response to anchor entity 304. In some embodiments, AUSF 308 sends an Nausf_UEAuthentication_Authenticate_Response message to anchor entity 3304. The UE authentication response can include the 5G SE AV. For example, AUSF 308 communicates the RAND, AUTN, HXRES* (e.g., the RAND, AUTN, and HXRES* can be included in the 5G SE AV).

At 332, an authentication response is communicated to UE 302. In some embodiments, anchor entity 304 communicates the authentication response to UE 302. The authentication response communicated to UE 302 is a response to the request communicated at 320. In some embodiments, anchor entity 304 communicates the authentication response in response to obtaining the UE authentication response at 330. For example, in response to obtaining the RAND and the AUTN (e.g., from the 5G SE AV), anchor entity 304 communicates the RAND and the AUTN to UE 302.

At 334, the AUTN is verified and a response is determined. In some embodiments, in response to receiving the RAND and the AUTN, UE 302 verifies the AUTN and determines a response (RES). As an example, the UMTS Subscriber Identity Module (USIM) verifies the AUTN and determines the response, RES. The Mobile Equipment (ME) (e.g., UE 302) can calculates RES* from RES. According to various embodiments, the ME calculates the KAUSF based at least in part on CK/IK, and the KAKMA from KAUS and the anchor function identifier.

At 336, an authentication request is communicated. In some embodiments, UE 302 sends RES* to anchor function 304. For example, in response to determining the RES*, UE 302 communicates an authentication request to anchor entity 304, and the authentication request includes the RES*.

At 338, an HRES* is determined based at least in part on the RES*. In some embodiments, anchor entity calculates HRES* from the RES*. For example, in response to receiving the authentication request and/or the RES*, anchor entity determines the HRES* based at least in part on the authentication request and/or the RES*. Verification of UE is performed based at least in part on comparing the HRES* to the HXRES*. For example, in response to determining the HRES*, anchor entity 304 determines whether the HRES* matches the HXRES* (e.g., whether the HRES* and the HXRES* are the same). If the HRES* and the HXRES* are consistent, verification (of UE 302) is deemed successful. For example, anchor entity 304 considers the verification successful from the perspective of anchor entity 304.

At 340, the RES* is communicated to AUSF 308. In some embodiments, anchor entity 304 sends the RES* to AUSF 308. For example, in response to receiving RES* from UE 302, anchor entity 304 sends RES* to AUSF 308. Anchor entity 304 can send the RES* to AUSF 308 in response to anchor entity 304 verifying the UE based at least in part on the HRES* and HXRES* (e.g., in response to verifying that HRES* and HXRES* match). The RES* can be communicated to AUSF 308 in connection with a UE authentication request (e.g., a NAUSF_UEAuthentication_Authenticate_Request message). The UE authentication request can include the RES*.

At 342, an authentication (e.g., a verification) with respect to RES* is performed. In some embodiments, AUSF 308 performs authentication of the RES* in response to receiving the RES* from anchor entity 304. Authentication with respect to the RES*can include comparing the RES* and the stored XRES* and determining whether the RES* and XRES* match (e.g., whether RES* and XRES* are the same or equal). In response to a determination that the RES* and the XRES* match, the authentication (of the RES*) is deemed successful. Conversely, in response to a determination that the RES* and the XRES* do not match, the authentication is deemed to be not-successful.

At 346, an authentication response is communicated. In some embodiments, AUSF 308 sends a response to the UE authentication request. The response to the UE authentication request is generated based at least in part on the authentication performed with respect to the RES*. For example, in response to a determination that the RES* and the XRES* match, AUSF 308 sends an indication that the authentication of UE 302 is successful. The authentication response can be communicated to anchor entity 304. The authentication response can include an indication of whether the authentication of UE 302 is successful. In some embodiments, the authentication response corresponds to an NAUSF_UEAuthentication_Authenticate_Response message. The authentication response can include a result of the authentication (e.g., of UE 302) and the KAKMA. In response to performing authentication, AUSF 308 can indicate to anchor entity 304 whether the authentication was successful from the home network perspective.

At 348, a temporary identifier and the key identifier are provided to UE 302. In some embodiments, in response to anchor entity 304 receiving the authentication response (e.g., a successful authentication result), anchor entity 304 provides UE 302 with the temporary identifier and the key identifier. Anchor entity 304 determines (e.g., calculates) a temporary identifier to bind the user ID to a key (e.g., bind the user ID to a key ID). The temporary identifier value can be generated in NAI format. The method uses base64 encoding and the anchor function identifier (e.g., base64encode (RAND) @anchor function identifier). In response to a determination that authentication was successful, anchor entity 304 sends a response message to the UE 302 to indicate that the authentication was successful. The response message can also include the temporary identifier and the KAKMA key lifetime. The KAKMA key lifetime can be an indication of the time for which the KAKMA is valid.

At 350, an instruction to update the session (e.g., session policy) is communicated. In some embodiments, anchor entity 304 sends a PCF session management policy control update message (e.g., an Npcf_SMPolicyControl_Update message)) to PCF 306. The PCF session management policy control update message includes the KAKMA ID and information pertaining to the session policy (e.g., the session for UE 302 communication). The information pertaining to the session policy can include one or more parameters for the session. In some embodiments, the information pertaining to the session policy includes one or more of an indication of a type of session, a session identifier, etc. The information pertaining to the session policy includes one or more QoS parameters. The session policy can be associated with the KAKMA associated with UE 302 (e.g., the KAKMA ID). In some embodiments, the one or more parameters for the session are associated with, or correspond to, the KAKMA associated with UE 302. The PCF session management policy control update message can also be referred to as a PCF session management policy control association message or a PCF session management policy control revision message. The PCF session management policy control update message effectively provides or establishes (e.g., causes PCF 306 to establish) an association between KAKMA and the new session policy. In some embodiments, PCF 306 presets a session policy corresponding to a session key (e.g., KAKMA or KAF) determined for an operator root key (e.g., the session key can be determined based at least in part on the operator root key). According to various embodiments, after UE 302 completes the bootstrapping authentication process through anchor entity 304, anchor entity 304 sends the KAKMA ID to PCF 306. PCF 306 can associate a preset session policy with the KAKMA ID. In some embodiments, the PCF session management policy update message sent by anchor entity 304 to PCF 306 can include a session policy ID. The session policy ID can indicate the session policy associated with (or to be associated with) the KAKMA ID.

At 352, a session policy is stored in association with a key identifier. In some embodiments, PCF 306 stores an association between the session policy and the key identifier (e.g., the KAKMA ID). For example, in response to receiving the instruction to update the session (e.g., PCF session management policy control update message), PCF 306 obtains the KAKMA ID and stores the KAKMA ID in association with the session policy corresponding to UE 302. PCF 306 can store the association of the session policy with the KAKMA ID in a mapping of session policies (e.g., session policy identifiers) to KAKMA IDs.

Figure 4A:
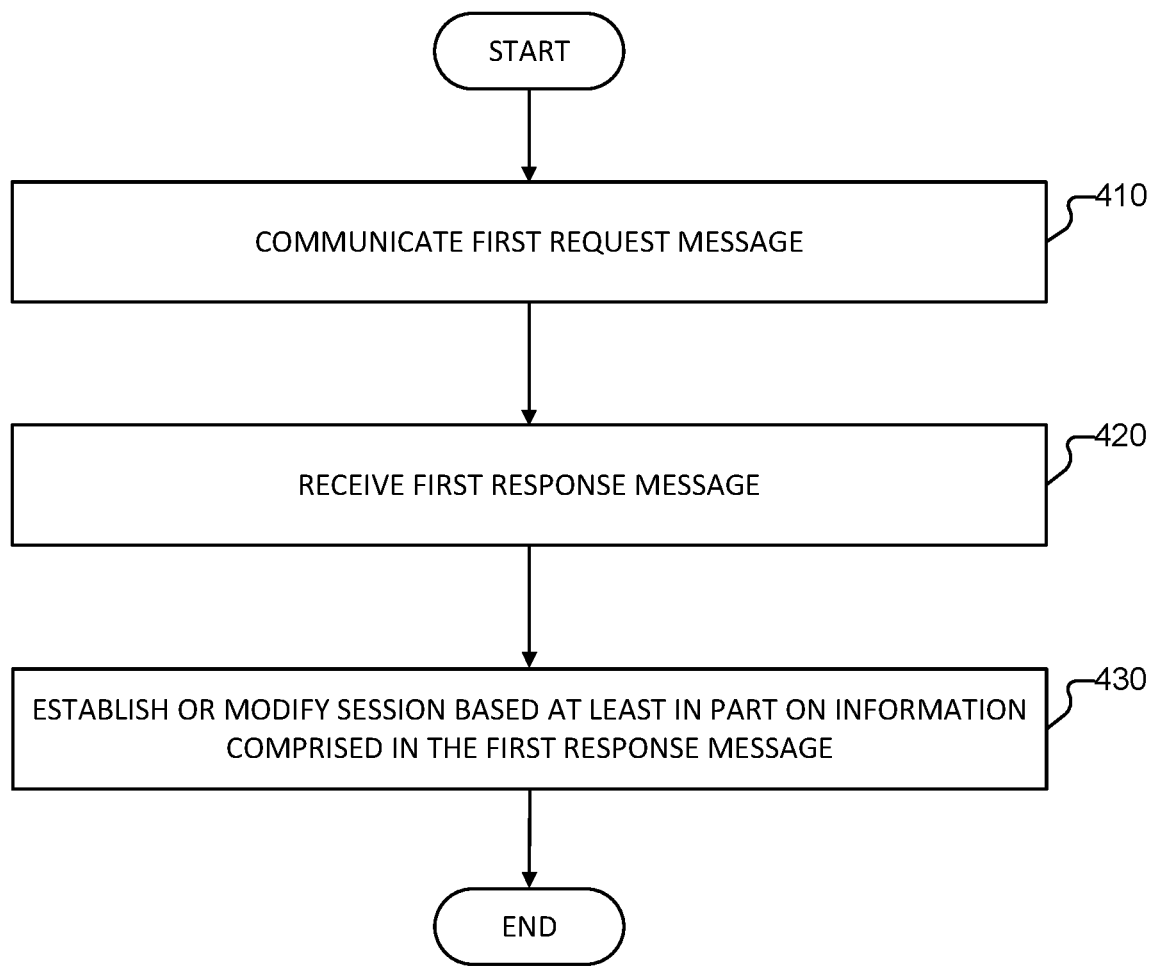
FIG. 4A is a flowchart of a method for establishing a session according to various embodiments of the present application.

FIG. 4A is a flowchart of a method for establishing a session according to various embodiments of the present application.

Referring to FIG. 4A, process 400 is provided. Process 400 can be implemented in connection with process 200 of FIG. 2, process 300 of FIG. 3, process 450 of FIG. 4B, process 500 of FIG. 5, and/or process 600 of FIG. 6. Process 400 can be implemented at least in part by computer system 700 of FIG. 7.

At 410, a first request message is communicated. In some embodiments, a session management entity communicates the first request message. As an example, a session management entity sends the first request message to a policy control entity. In some embodiments, the first request message includes a key identifier. The first request message can include one or more of an identifier associated with the session management entity, other information pertaining to the session or session policy, etc. In some embodiments, the key corresponding to the key identifier is used in connection with generating an application-layer end-to-end key (e.g., a KAF determined based at least in part on a KAKMA). The application-layer end-to-end key in the scheme described herein is not limited to an application-layer key, such as KAF, derived from an operator root key. Various other keys can be used. In some embodiments, if the SMF determines that a session for the UE is to be created, the SMF requests the PCF whether there are any policy that needs to follow. As an example, the SMF can communicate the first request message in response to determining that a session for the UE is to be created (e.g., established).

In some embodiments, the first request message includes a session policy control-based create message (e.g., Npcf_SMPolicyControl_Create).

At 420, a first response message is received. In some embodiments, the session management entity receives the first response message. The session management entity can receive the first response message from the policy control entity. The first response message can correspond to a message sent back by the policy control entity in response to the first request message. According to various embodiments, the first response message comprises information pertaining to a session policy for the session corresponding to the key identifier (e.g., the key identifier comprised in the first request message). In some embodiments, the information pertaining to a session policy includes one or more parameters corresponding to the session policy. For example, the information pertaining to a session policy includes an indication of a type of the session policy, one or more QoS parameters, etc. The information pertaining to the session policy can be used in connection with modifying the one or more parameters of the session policy (e.g., QoS parameters such as QoS priority, etc.). In some embodiments, the first response message comprises (or corresponds to) a session management policy control create response message (e.g., Npcf_SMPolicyControl_Create Response).

At 430, a session is established or modified. In some embodiments, the session is established based at least in part on information comprised in the first response message. As an example, the session management entity establishes or modifies a session based on the session policy (e.g., the information pertaining to the session). For example, the session management entity establishes a corresponding QoS session priority based on the QoS priority. The session management entity can obtain the information pertaining to the session, and configure (e.g., establish, modify, etc.) the corresponding session. For example, the 5GI value (5G QoS indicator) corresponding to the session is modified.

According to various embodiments, a key identifier is comprised in the first request message during the process of establishing or modifying a session. Therefore, different application-layer keys may be used to differentiate between corresponding sessions or services.

According to various embodiments, in the case of a single UE or a single type of UE, the UE can participate in multiple services or sessions. For example, one session policy corresponds to each session, and the session policy of each session can be differentiated by the key identifier in connection with establishing or modifying the session. A core network element can determine (e.g., detect) services or sessions using AKMA to generate an application key and provide differentiable services for sessions corresponding to AKMA application-layer keys. According to various embodiments, after the UE generates an application-layer key, the user equipment (UE) in the Internet of Things sends an application-layer message to an application-layer server. For example, the UE can generate the application-layer key based at least in part on a first key generated on the basis of the 5G core network, and the user equipment (UE) in the Internet of Things sends an application-layer message to the application-layer server. The application-layer message can be a message encrypted with the application-layer key. In some embodiments, before the application-layer server provides corresponding service to the UE, the UE sends a session establishment request to the access and mobility management function (AMF) entity in the core network. The session establishment request includes the key identifier for the first key. The AMF entity selects an SMF to establish a session. For example, at least part of process 200 can be used in connection with the session establishment (e.g., the selection of the SMF to establish the session).

In some embodiments, before the PCF sends a session policy to the SMF, the PCF send a request to a UDR in connection with obtaining the relevant data necessary to establish a session. For example, if the PCF determines that subscription data for a particular UE is not stored locally (or accessible to the PCF), the PCF will send a request to a UDR to obtain the relevant data necessary to establish a session.

According to various embodiments, because the SMF uses a key identifier in connection with requesting a session policy, the SMF obtains the corresponding key identifier before 410. For example, before the SMF entity sends a first request message to the policy control entity, the session management entity receives a second request message from an AMF entity, wherein the second request message is for requesting context information to establish a session. The second request message can include the key identifier. As an example, the second request message comprises (or corresponds to) an Nsmf_PDUSession_CreateSMContext request message.

In some embodiments, the access and mobility entity determines the session management function for configuring a session. For example, the session management function entity is determined by the access and mobility entity based at least in part on the key identifier in the received session establishment request message. According to various embodiments, before receiving the second request message from the AMF entity, the AMF entity receives a request from a UE to establish a session. For example, the AMF receives a session establishment request message from the UE. The session establishment request message can include at least: a key identifier. The AMF entity determines the SMF entity used to receive the second request message. The selection policy of the SMF entity is related to the parameter attributes corresponding to the slice. For example, the AMF uses the NSSF to determine the corresponding SMF. In some embodiments, the AMF determines the SMF based at least in part on determination based on the load condition of the SMF entity. The AMF can use various other information or factors in connection with selecting the SMF entity. The session establishment request message can include a PDU Session Establishment Request message.

In some embodiments, the session establishment request message further includes at least one of: a session ID and a session type.

The session policy can be obtained according to various processes. For example, before receiving the first response message sent back by the policy control entity (e.g., before receiving the corresponding session policy), the SMF entity receives a first message sent by the policy control entity. The first message can include a key identifier and a session policy corresponding to the key identifier. The first message can be obtained by the policy control entity from an anchor entity.

As another example, the PCF presets a session policy corresponding to the AKMA key. In response to receiving the key ID from the anchor entity, the PCF can automatically match the session policy and the key ID. For example, the PCF looks up the session policy corresponding to the key ID. The PCF can obtain the session policy based on a stored mapping of session policies to key IDs.

In some embodiments, a first response message includes (or corresponds to) a message that is configured for sending the key identifier and corresponding session policy. For example, the PCF entity receives a third request message from an anchor entity, and the third request message can correspond to a request that the session policy be updated. In some embodiments, the third request message comprises: a key identifier and a session policy for the session corresponding to the key identifier. The anchor entity can send an update message for updating the session policy to the PCF. The PCF obtains the session ID from the update message, and the PCF can store one or more of the session ID and the session policy corresponding to the key identifier.

The first response message can also be an existing interactive message between the SMF and the PCF. As an example, the first response message can be selected or configured flexibly according to actual conditions.

Figure 4B:
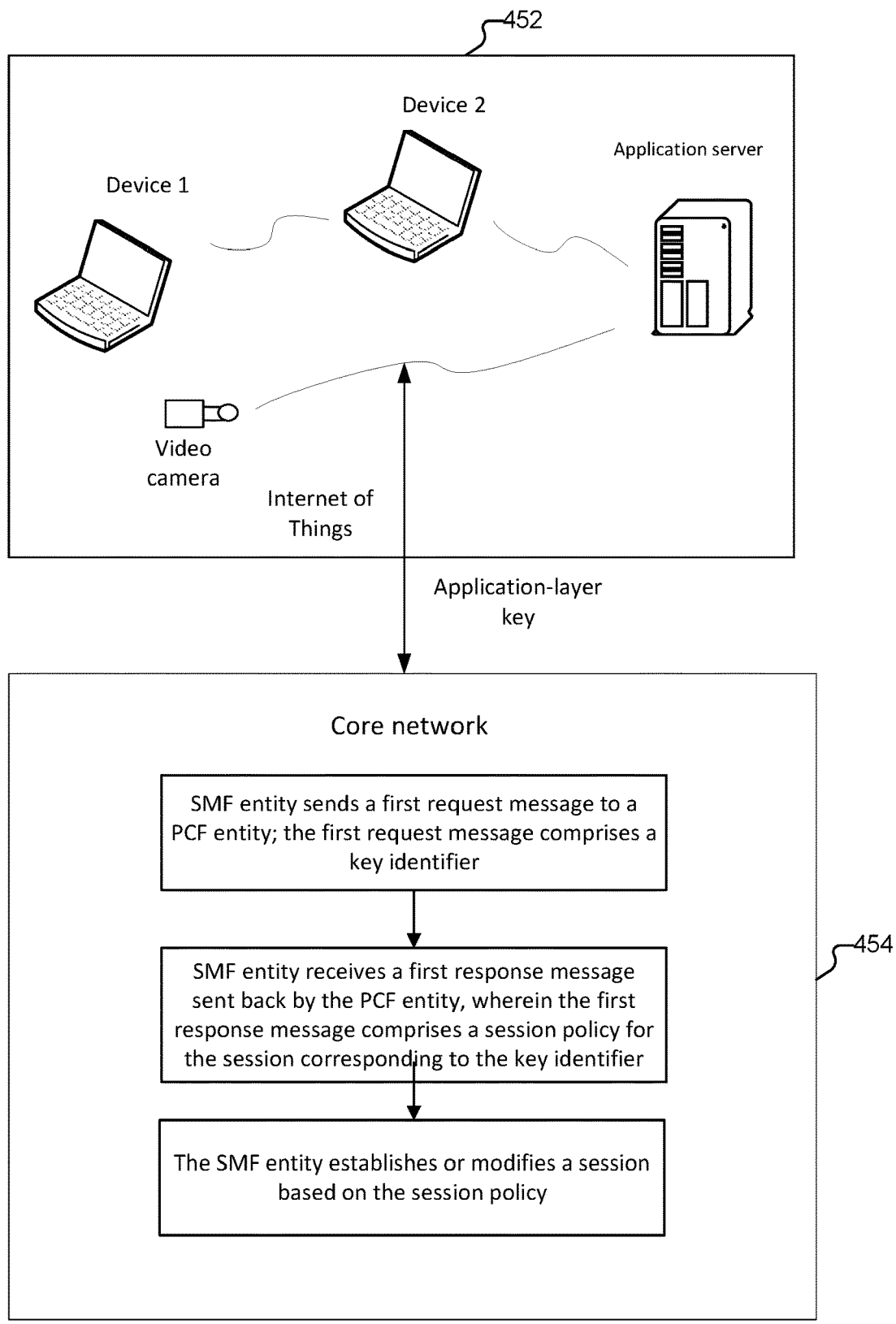
FIG. 4B is a flowchart of a method for establishing a session according to various embodiments of the present application.

FIG. 4B is a flowchart of a method for establishing a session according to various embodiments of the present application.

Referring to FIG. 4B, process 450 is provided. Process 450 can be implemented in connection with process 200 of FIG. 2, process 300 of FIG. 3, process 400 of FIG. 4A, process 500 of FIG. 5, and/or process 600 of FIG. 6. Process 450 can be implemented at least in part by computer system 700 of FIG. 7.

As illustrated in FIG. 4B, Internet of Things 452 can comprise one or more terminals. Internet of Things 452 can include one or more of device 1, device 2, application server, video camera, etc. Internet of Things 452 can be connected to core network 454 via one or more networks. The one or more networks can include a wired network, a wireless network, both a wired network and a wireless network, etc. In the application context of a narrowband Internet of Things 452, after core network 454 generates an application-layer key, core network 454 generates a key identifier of the application-layer key and applies the key identifier to an interactive process flow between elements of core network 454. As an example, in an Internet of Things context, a video camera of Internet of Things 452 captures user image information and sends the image information to an application server. To ensure security, Internet of Things can encrypt the image information with an application-layer key while uploading images. The application server recognizes user identity based on the image information and executes a corresponding operation. In some embodiments, the application server authenticates a user and/or the video camera. In response to authenticating the user and/or video gamer (e.g., after the user identity is verified), the application server performs an unlock operation on the door lock.

Figure 5:
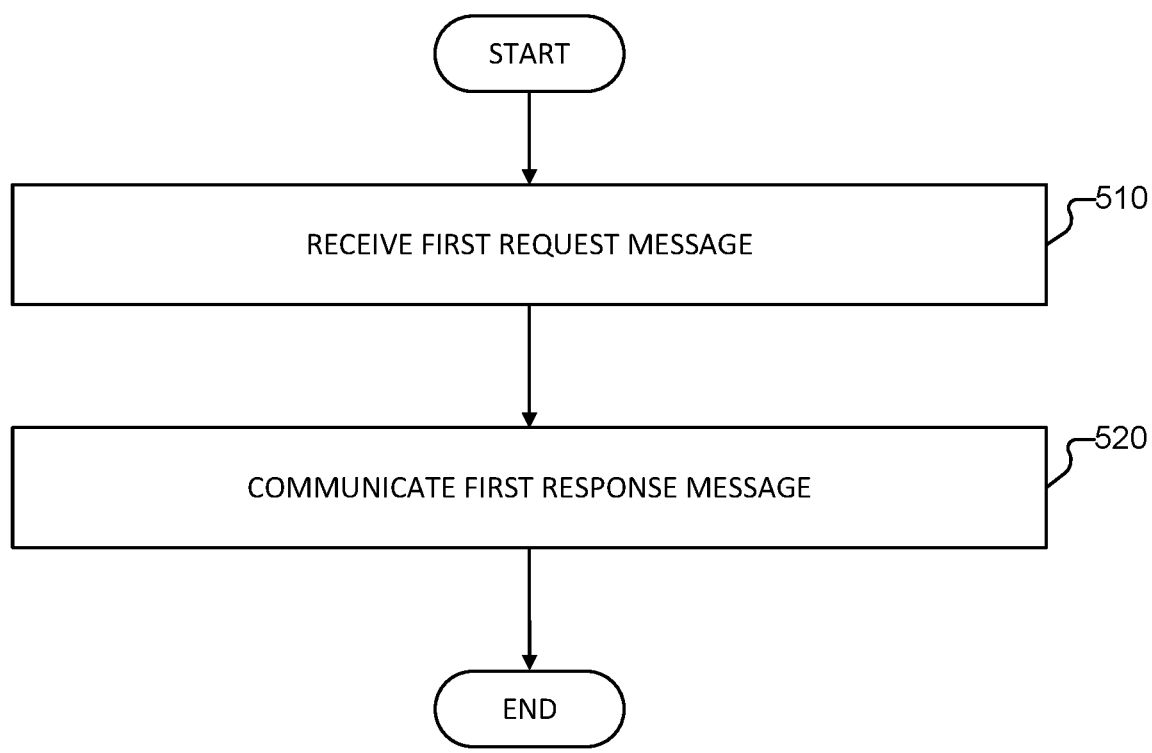
FIG. 5 is a flowchart of a method for establishing a session according to various embodiments of the present application.

FIG. 5 is a flowchart of a method for establishing a session according to various embodiments of the present application.

Referring to FIG. 5, process 500 is provided. Process 500 can be implemented in connection with process 200 of FIG. 2, process 300 of FIG. 3, process 400 of FIG. 4A, process 450 of FIG. 4B, and/or process 600 of FIG. 6. Process 500 can be implemented at least in part by computer system 700 of FIG. 7.

At 510, a first request message is received. In some embodiments, the first request message includes a key identifier. The key identifier can be associated with one or more of a UE, a session, etc. As an example, a PCF entity receives a first request message from an SMF entity. The PCF can receive the first request message in connection with the configuring (e.g., establishing, modifying, etc.) of a session corresponding to the UE.

At 520, a first response message is communicated. The first response message can be communicated in response to the first request message. In some embodiments, the PCF entity sends the first response message to the SMF entity. The first response message can comprise information pertaining to a session policy (e.g., the session policy for a session corresponding to a UE). The information pertaining to the session policy can include one or more parameters corresponding to a session policy (e.g., a type of session policy, QoS parameters, etc.). The first response message can include information pertaining to a session policy for the session corresponding to the key identifier (e.g., the key identifier included in the first request message). According to various embodiments, the first request message is used in connection with the SMF entity configuring (e.g., establishing, modifying, etc.) a session based on the session policy.

In some embodiments, before sending a first response message to the SMF entity, the PCF entity receives a first message from an anchor entity. The first message (e.g., that the PCF receives from the anchor entity) comprises: the key identifier and a session policy corresponding to the key identifier. For example, the PCF entity receives a third request message from an anchor entity. The third request message can correspond to a request that the session policy be updated. The third request message comprises: the key identifier and a session policy for the session corresponding to the key identifier.

The SMF entity can send a first request message to a PCF entity. As an example, the first request message comprises a key identifier. The first request message can include, or correspond to, a session policy control-based create message (e.g., Npcf_SMPolicyControl_Create).

After 520, the SMF entity receives a first response message sent back by the PCF entity (e.g., in response to the first request message communicated by the SMF entity). The first response message can include a session policy for the session corresponding to the key identifier. In some embodiments, the session policy includes one or more parameters for the session. For example, the session policy (or information pertaining to the session) includes one or more of a QoS parameter, a type of session policy, etc. The session policy (or information pertaining to the session) can be used in connection with modifying the QoS parameters for the session. The QoS parameters can include a QoS priority. The first response message can include a session management policy control create response message (e.g., Npcf_SMPolicyControl_Create Res). The SMF entity configures (e.g., establishes or modifies) a session based on the session policy. For example, the SMF entity establishes a corresponding QoS session priority based at least in part on the QoS priority (corresponding to the session policy included in the first response message).

Figure 6:
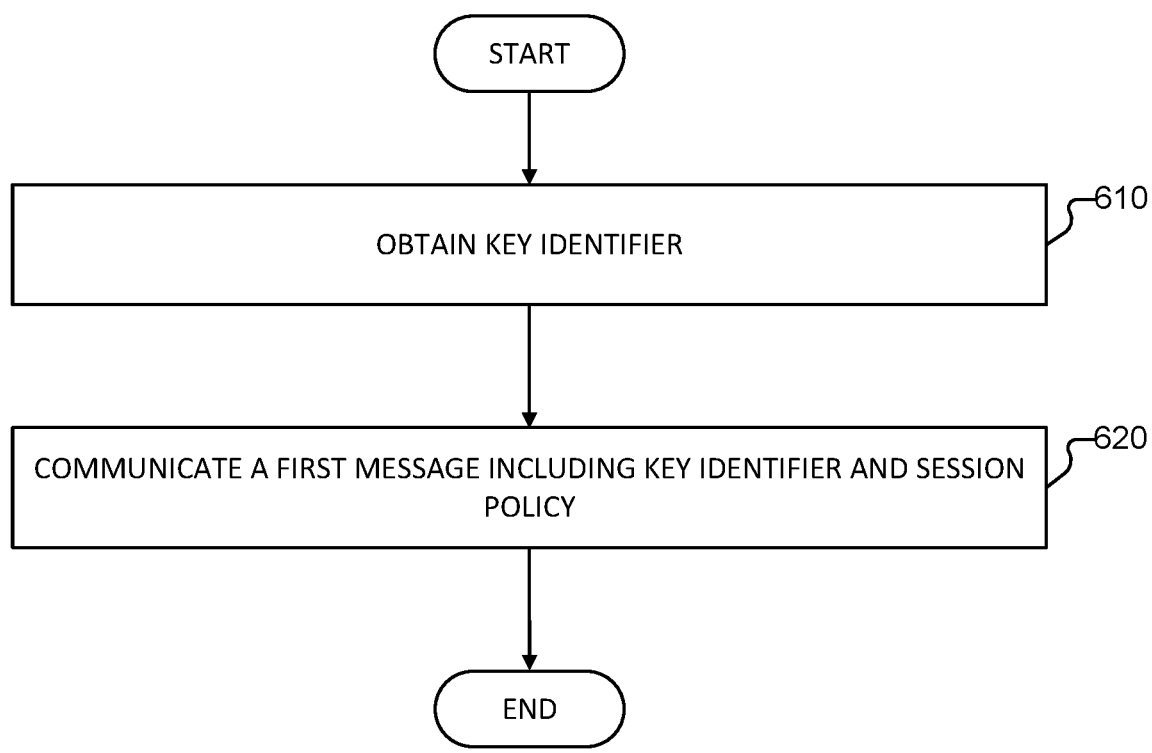
FIG. 6 is a flowchart of a method for establishing a session according to various embodiments of the present application.

FIG. 6 is a flowchart of a method for establishing a session according to various embodiments of the present application.

Referring to FIG. 6, process 600 is provided. Process 600 can be implemented in connection with process 200 of FIG. 2, process 300 of FIG. 3, process 400 of FIG. 4A, process 450 of FIG. 4B, and/or process 500 of FIG. 5. Process 600 can be implemented at least in part by computer system 700 of FIG. 7.

At 610, a key identifier is obtained. In some embodiments, an anchor entity obtains a key identifier. The anchor entity can obtain the key identifier based at least in part on one or more messages received from the UE. For example, the anchor entity obtains the key identifier based at least in part on a request from the UE for a session establishment.

At 620, a first message is communicated. The first message can include the key identifier and information pertaining to a session. The session corresponds to the key identifier (e.g., the session is mapped to the key identifier in a mapping of session identifiers to key identifiers). As an example, the information pertaining to the session includes a session policy. The session policy can correspond to a session to be configured for UE communication. In some embodiments, the anchor entity sends the first message to a PCF entity. The aforementioned first message can include, or correspond to, a message for sending the key identifier and corresponding session policy. In some embodiments, the PCF entity receives a third request message from an anchor entity. As an example, the third request message corresponds to a request that the session policy be updated. The third request message can include the key identifier and a session policy for the session corresponding to the key identifier. In some embodiments, the anchor entity sends an update message for updating the session policy to the PCF. In response to receiving the update message, the PCF obtains the corresponding session ID and the session policy based at least in part on the update message, and the PCF records the session ID and the session policy. For example, the PCF stores the session ID comprised in the update message and the session policy corresponding to the key identifier.

Figure 7:
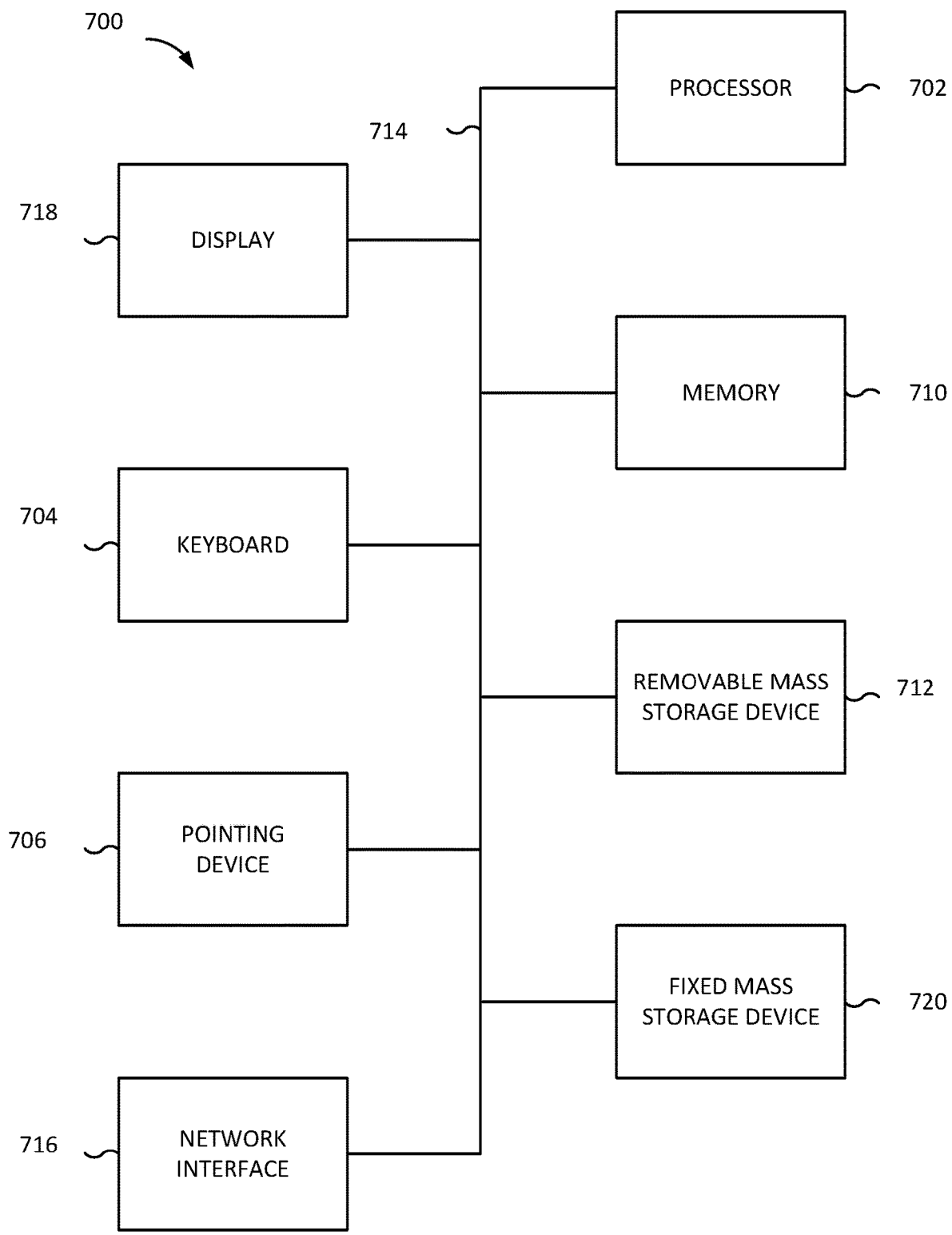
FIG. 7 is a functional diagram of a computer system according to various embodiments of the present application.

FIG. 7 is a functional diagram of a computer system according to various embodiments of the present application.

Referring to FIG. 7, computer system 700 is provided. Computer system 700 can implement at least part of process 200 of FIG. 2, process 300 of FIG. 3, process 400 of FIG. 4A, process 450 of FIG. 4B, process 500 of FIG. 5, and/or process 600 of FIG. 6.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Please note that all the method embodiments described above have been presented as a series of a combination of actions in order to simplify description. However, persons skilled in the art should know that the present application is not limited by the action sequences that are described, for some of the steps may make use of another sequence or be implemented simultaneously in accordance with the present application. Furthermore, persons skilled in the art should also know that the embodiments described in the specification are preferred embodiments and that the actions and modules involved therein are not necessarily required by the present application.

Through descriptions of the above implementations, persons skilled in the art can clearly understand that methods based on the above embodiment may be realized through software with the necessary general-use hardware platform. Of course, hardware may also be used, but in many cases the former is the preferred implementation. Based on such an understanding, the technical solution of the present application, whether intrinsically or with respect to portions that contribute to the prior art, is realizable in the form of software products. These computer software products can be stored on storage media (such as ROM/RAM, magnetic disks, and optical disks) and include a certain number of instructions used to cause a piece of terminal equipment (which could be a mobile telephone, a computer, a server, or network equipment) to execute the methods of the embodiments of the present application.

Persons with ordinary skill in the art can understand that all or some of the steps in the various methods of the embodiments described above may be completed through programs instructing computer terminal-related hardware. The programs may be stored in computer-readable storage media, and the storage media may comprise flash drives, read-only memory (ROM), random access memory (RAM), magnetic disks, or optical disks.

Various embodiments provide a communication system. The communication system comprises: a session management entity and a policy control entity. The session management entity is configured to send a first request message to the policy control entity, and the first request message comprises a key identifier. The session management entity is further configured to configure (e.g., establish or modify) a session based on a session policy provided as feedback by the policy control entity. The policy control entity is configured to send a first response message to the session management entity. The first response message comprises the session policy for the session corresponding to the key identifier.

Various embodiments provide a storage medium. The storage medium can be configured to save the program code executed by the session establishment method described above.

In some embodiments, the storage medium is to be located on a terminal (e.g., a computer within a computer terminal group in a computer network or on any mobile terminal within a mobile terminal group).

In some embodiments, the storage medium is configured to store program code for executing the processes described herein. For example, the storage medium is configured to store program code for executing a session management entity sending a first request message to a policy control entity, the first request message comprising a key identifier; the session management entity receiving a first response message sent back from the policy control entity, wherein the first response message comprises a session policy for the session corresponding to the key identifier; and the configuring (e.g., establishing or modifying) of a session based on the session policy by the session management entity.

The sequential numbers of the embodiments described above are merely descriptive and do not represent the relative superiority or inferiority of the embodiments.

In the present application embodiments described above, the description of each embodiment has its respective emphasis, and parts of an embodiment are not described in detail. One may refer to other embodiments for the relevant descriptions.

Please understand that, in several embodiments provided by the present application, the disclosed technical content may be implemented in other ways. The means embodiments described above are merely illustrative. For example, the division into units is merely a division by logical function. When actually implemented, there may be other forms of division. For example, multiple units or components may be combined or integrated into another system, or some features might be omitted or not executed. Also, couplings or direct couplings or communication connections between things that are displayed or discussed may be through some interfaces. Indirect couplings or communication connections between units or modules may be electrical or otherwise.

Units as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, each functional unit in each of the embodiments of the present application may be integrated into a processing unit, or each unit may have an independent physical existence. Or two or more units may be integrated into one unit. The integrated units described above may be implemented in the form of hardware, or they may be implemented in the form of software functional units.

If an integrated unit is implemented in the form of software functional units for sale or use as independent products, they may be stored in a computer-readable storage medium. With such an understanding, it becomes clear that the technical schemes of the present application, whether intrinsically or those portions that contribute to the prior art, or all or part of the technical schemes, may be embodied in the form of software products. These computer software products are stored in a storage medium and comprise some instructions for causing a computer device (which could be a personal computer, a server, or a network device) to execute all or some of the steps in the methods of the various embodiments of the present application. The storage medium described above encompasses: USB flash drives, read-only memory (ROM), random access memory (RAM), mobile hard drives, magnetic or optical disks, or various other media that can store program code.

The above are merely preferred embodiments of the present application. Please note that persons with ordinary skill in the art could also make certain improvements and embellishments and that these improvements and embellishments should also be regarded as being within the protective scope of the present application, so long as they do not depart from the principles of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   sending, by a session management entity of a wireless network, a first request message to a policy control entity of the wireless network, the first request message comprising a key identifier;
   receiving, by the session management entity, a first response message from the policy control entity, wherein the first response message corresponds to a response to the first request message, and the first response message comprises a session policy for a communication session corresponding to the key identifier; and
   configuring, by the session management entity, the communication session based at least in part on the session policy.

2. The method of claim 1, wherein the key identifier corresponds to a user equipment communicating via a network.

3. The method of claim 1, further comprising:
   receiving, by the session management entity, a second request message from an access and mobility management entity of the wireless network, wherein:
   the second request message is received before the session management entity sends the first request message;
   the second request message is used in connection with requesting context information to establish the communication session; and
   the second request message comprises the key identifier.

4. The method of claim 1, wherein the session management entity is determined by an access and mobility entity based at least in part on the key identifier, and the access and mobility entity obtains the key identifier from a received session establishment request message.

5. The method of claim 1, further comprising:
   receiving, by the session management entity, a second message from the policy control entity, wherein:
   the second message is received before the session management entity receives the first response message;
   the first response message comprises the key identifier and the session policy corresponding to the key identifier; and
   the second message corresponds to a third request message obtained by the policy control entity from an anchor entity of the wireless network.

6. The method of claim 5, wherein the method further comprises:
   receiving, by the policy control entity of the wireless network, the third request message from the anchor entity, wherein:
   the third request message is received by the policy control entity before the session management entity receives the second message from the policy control entity;
   the third request message corresponds to a request that the session policy be updated; and
   the third request message comprises: the key identifier and the session policy for the communication session corresponding to the key identifier.

7. A method, comprising:
   receiving, by a policy control entity of a wireless network, a first request message from a session management entity of the wireless network, the first request message comprising a key identifier; and
   sending, by the policy control entity, a first response message to the session management entity, wherein:
   the first response message comprises a session policy for a communication session corresponding to the key identifier; and
   the first response message causes the session management entity to configure the communication session based at least in part on the session policy.

8. The method of claim 7, further comprising:
   receiving, by the policy control entity, a second message from an anchor entity of the wireless network, wherein:
   the policy control entity receives the second message before the policy control entity sends the first response message; and
   the second message comprises: the key identifier and the session policy corresponding to the key identifier.

9. The method of claim 8, wherein the method further comprises:
   receiving, by the policy control entity, a third request message from the anchor entity, wherein:

the policy control entity receives the third request message before the session management entity receives the first response message from the policy control entity;

the third request message corresponds to a request that the session policy be updated; and the third request message comprises: the key identifier and the session policy for the communication session corresponding to the key identifier.

10. A method, comprising:

obtaining, by an anchor entity of a wireless network, a key identifier; and sending, by the anchor entity, a first message to a policy control entity of the wireless network, wherein the first message comprises: the key identifier and a session policy for a communication session corresponding to the key identifier.

11. A device, comprising:

one or more processors configured to:

send a first request message to a policy control entity of a wireless network, the first request message comprising a key identifier;

receive a first response message from the policy control entity, wherein the first response message corresponds to a response to the first request message, and the first response message comprises a session policy for a communication session corresponding to the key identifier; and configure the communication session based at least in part on the session policy; and one or more memories coupled to the one or more processors, configured to provide the one or more processors with instructions.

12. The device of claim 11, wherein the key identifier corresponds to a user equipment communicating via a network.

13. The device of claim 12, wherein the key identifier is generated by an application-level component of the user equipment.

14. The device of claim 11, wherein the one or more processors are further configured to:

receive a second request message from an access and mobility management entity of the wireless network;

the second request message is received before a session management entity sends the first request message;

the second request message is used in connection with requesting context information to establish the communication session; and the second request message comprises the key identifier.

15. The device of claim 11, wherein a session management entity is determined by an access and mobility entity of the wireless network based at least in part on the key identifier, and the access and mobility entity obtains the key identifier from a received session establishment request message.

16. The device of claim 11, wherein the one or more processors are further configured to:

receive a second message from the policy control entity;

the second message is received before a session management entity receives the first response message;

the second message comprises the key identifier and the session policy corresponding to the key identifier; and the second message corresponds to a third request message obtained by the policy control function entity from an anchor entity of the wireless network.

17. A device, comprising:

one or more processors configured to:

receive a first request message from a session management entity of a wireless network, the first request message comprising a key identifier; and send a first response message to the session management entity, wherein:

the first response message comprises a session policy for a communication session corresponding to the key identifier; and the first response message causes the session management entity to configure the communication session based at least in part on the session policy; and one or more memories coupled to the one or more processors, configured to provide the one or more processors with instructions.

18. A computer program product, the computer program product being embodied in a non-transitory computer readable storage medium and comprising computer instructions for:

sending, by a session management entity of a wireless network, a first request message to a policy control entity of the wireless network, the first request message comprising a key identifier;

receiving, by the session management entity, a first response message from the policy control entity, wherein the first response message corresponds to a response to the first request message, and the first response message comprises a session policy for a communication session corresponding to the key identifier; and configuring, by the session management entity, the communication session based at least in part on the session policy.

19. A computer program product, the computer program product being embodied in a non-transitory computer readable storage medium and comprising computer instructions for:

receiving, by a policy control entity, a first request message from a session management entity, the first request message comprising a key identifier; and sending, by the policy control entity, a first response message to the session management entity, wherein:

the first response message comprises a session policy for a communication session corresponding to the key identifier; and the first response message causes the session management entity to configure the communication session based at least in part on the session policy.

* * * * *

UNITED STATES PATENT AND TRADEMARK OFFICE
CERTIFICATE OF CORRECTION

| | |
|---|---|
| PATENT NO. | : 11,368,842 B2 |
| APPLICATION NO. | : 16/995524 |
| DATED | : June 21, 2022 |
| INVENTOR(S) | : Xiaobo Yu |

It is certified that error appears in the above-identified patent and that said Letters Patent is hereby corrected as shown below:

On the Title Page

Item (73), assignee, address, insert --George Town (KY)--.

Signed and Sealed this
Fourth Day of October, 2022

Katherine Kelly Vidal
*Director of the United States Patent and Trademark Office*